Aug. 14, 1951 C. A. SHOEMAKER 2,564,510
OVERHEAD SUSPENSION FOR OPTICAL WHEEL ALIGNERS
Filed Dec. 4, 1948 4 Sheets-Sheet 1

INVENTOR
CLYDE A. SHOEMAKER
BY Hans G. Hofmeister
ATTORNEY

Aug. 14, 1951       C. A. SHOEMAKER       2,564,510
OVERHEAD SUSPENSION FOR OPTICAL WHEEL ALIGNERS
Filed Dec. 4, 1948                     4 Sheets-Sheet 4

FIG_7

INVENTOR
CLYDE A. SHOEMAKER
BY Hans G. Hoffmeister
ATTORNEY

Patented Aug. 14, 1951

2,564,510

UNITED STATES PATENT OFFICE 2,564,510

OVERHEAD SUSPENSION FOR OPTICAL WHEEL ALIGNERS

Clyde A. Shoemaker, Lansing, Mich., assignor to Food Machinery and Chemical Corporation, San Jose, Calif., a corporation of Delaware Application December 4, 1948, Serial No. 63,512

16 Claims. (Cl. 88—14)

1

This invention relates to overhead suspension apparatus for use with equipment for checking the alignment characteristics of vehicle wheels or the like.

For purposes of illustration, the present invention is shown employed with a device for optically measuring the alignment characteristics of vehicle wheels as disclosed in the Tracy Carrigan application, Ser. No. 659,317, filed April 3, 1946 or application Ser. No. 571,716, filed January 5, 1945, Patent No. 2,470,090, issued May 17, 1949, in which I am coinventor with Tracy Carrigan on a similar device for the same purpose. Devices of the character described in these two applications generally comprise a projection head for projecting light beams toward mirrors mounted on vehicle wheels for reflection, determined by the alignment characteristics of the wheels, onto a screen so as to visually display any faults in alignment of such wheels. The positioning of the projection head relative to the wheels is essential to a minimum of error in readings of the instrument and heretofore it was deemed necessary to mount the projection head on a pedestal either adjacent to or in connection with a rack for supporting the vehicle in a manner to permit turning of the wheels.

The present invention contemplates supporting the various instrumentalities at a level conducive to manipulation of the wheel checking device, as well as the vehicle wheels without unnecessary stooping or squatting on the part of the attending mechanic.

Another object of this invention is to provide apparatus by which the attending mechanic can readily adjust and correct faulty wheel alignment during visual display of the alignment characteristics of the wheels of the vehicle.

Another object is to provide a support for the projection heads which will facilitate removal thereof from beside the vehicle wheels, when it is desired to adjust the latter, and to facilitate return of the projection heads without altering the critical operating position thereof relative to the vehicle wheels.

Another object is to provide an overhead support which permits immediate disposal of the projection heads so that floor space is available for purposes other than wheel aligning.

Another object is to provide apparatus by which each projection head and its internal optical unit can be stored in a location where it will be less likely to become damaged and where it is always available for immediate use.

Another object is to provide a support which is

2 readily adjustable to facilitate adaptation of the wheel checking equipment to vehicles of various wheel gauge and wheel base, as well as various wheel diameter.

Another object is to provide overhead suspension apparatus with a cushioning device for absorbing shock caused by sudden stopping of the measuring instrument when it arrives at either of its extreme positions for storage or use.

These and other objects of the present invention will become apparent in the following description and the appended claims when read in the light of the accompanying drawings in which:

Figure 1:
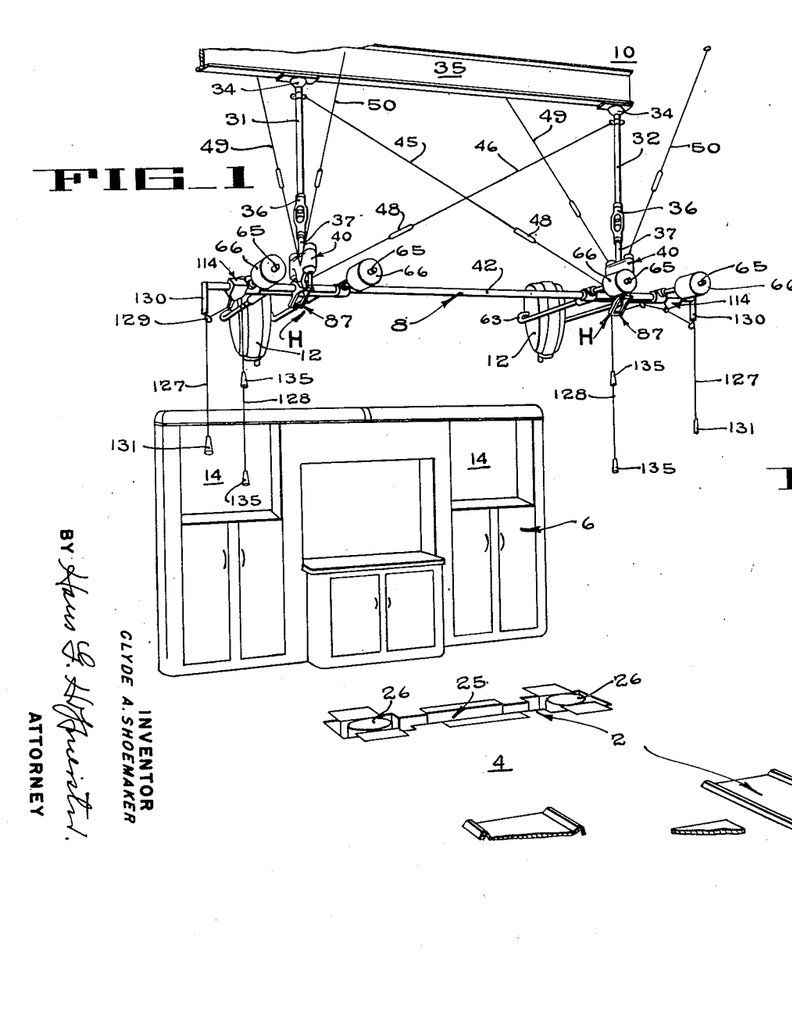
Fig. 1 is a perspective view of a portion of the interior of a building showing the present invention installed therein.

Referring to Fig. 1 of the drawings, the present invention is shown installed in a suitable area of a building in which a twin post lift 2 is built into the floor 4 in alignment with a viewing cabinet 6 and beneath an overhead supporting apparatus 8 suitably suspended from the ceiling 10 of the building. The twin post lift 2 is so disposed that a vehicle can be driven onto the platform provided by the lift for elevation into the position shown in Fig. 2 between a pair of error detecting instruments in the form of projection heads 12 carried by the apparatus 8. The projection heads 12 are adapted to be lowered into operative position for projecting images onto separate screens 14 in the viewing cabinet 6 when the vehicle is disposed in proper elevated position upon the lift 2.

Figure 3:
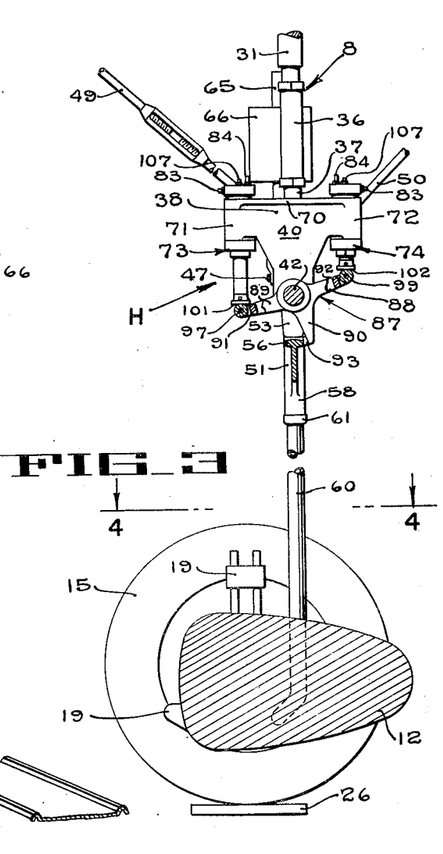
Fig. 3 is a partial section of Fig. 2 taken substantially along line 3—3 thereof.

The relative disposition of the projection heads 12 with respect to the dirigible wheels 15 of a vehicle 16 is illustrated in Fig. 3 and, as described in the Tracy Carrigan application, Ser. No. 659,317, certain optical instrumentalities within the projection heads project a cruciformed chart 17 onto the screens 14. A light beam is also projected laterally from each head 12 toward the adjacent vehicle wheel 15 for reflection back into the respective projection head and thence onto the screen associated therewith for comparison with "normal" indicia in the image of the cruciformed chart 17.

A triple-faced mirror 18 is suitably secured by a clamp 19 to each of the front wheels 15 of the vehicle in a position to receive the light beam projected laterally from the adjacent projection head for reflecting such light beam back into the head 12. A flat mirror 20 is suitably suspended from each driving wheel 21 of the vehicle by a rod 22 extending laterally from a clamp 23 which is secured to the respective wheel 21 so as to support its associated mirror 20 in a plane to receive a light beam projected rearwardly from the projection head. The light beam impinging upon the mirror 20 is reflected over the top of the projection head 12 and onto the screen 14 of the viewing cabinet 6 for comparison with "normal" indicia on the cruciformed chart mentioned above. Upon jacking up the rear axle of the vehicle 16 and rotating the drive wheels 21, any deviation of the outer face of the wheels from a position perpendicular to the axis of rotation of the wheels will be visually reflected from the mirror 20 onto the screen so as to indicate the amount and direction of disalignment of such wheels.

It will be noted that the forward section 25 of the lift mechanism is provided with turntables 26 upon which the respective dirigible wheels rest so that they may be turned into predetermined angular positions either inwardly or outwardly relative to "straight ahead." By reason of such turning of the wheels either angularly disposed surface 18a or 18b of the triple-faced mirror 18 can be disposed in a plane to reflect the lateral light beam back into the related projection head for reflection onto the screen 14. In this manner, the various light beams projected from each projection head are brought into testing relationship with either the front or rear wheels of the vehicle and the alignment characteristics of such wheels reflected upon the screen.

From the foregoing, the importance of accurately positioning the projection heads 12 in proper operating relationship with respect to the vehicle wheel 15 or 21 is apparent. The apparatus 8, Figs. 1 to 3, 6, and 7, for supporting the projection heads 12 in the position desired comprises a pair of hanger rods 31 and 32. The upper end of each rod 31 and 32 is provided with a ball 33, suitably disposed in a socket 34 secured to an overhead beam 35, or other such anchorage, provided in the ceiling 10 of the building in which the apparatus is employed.

Figure 7:
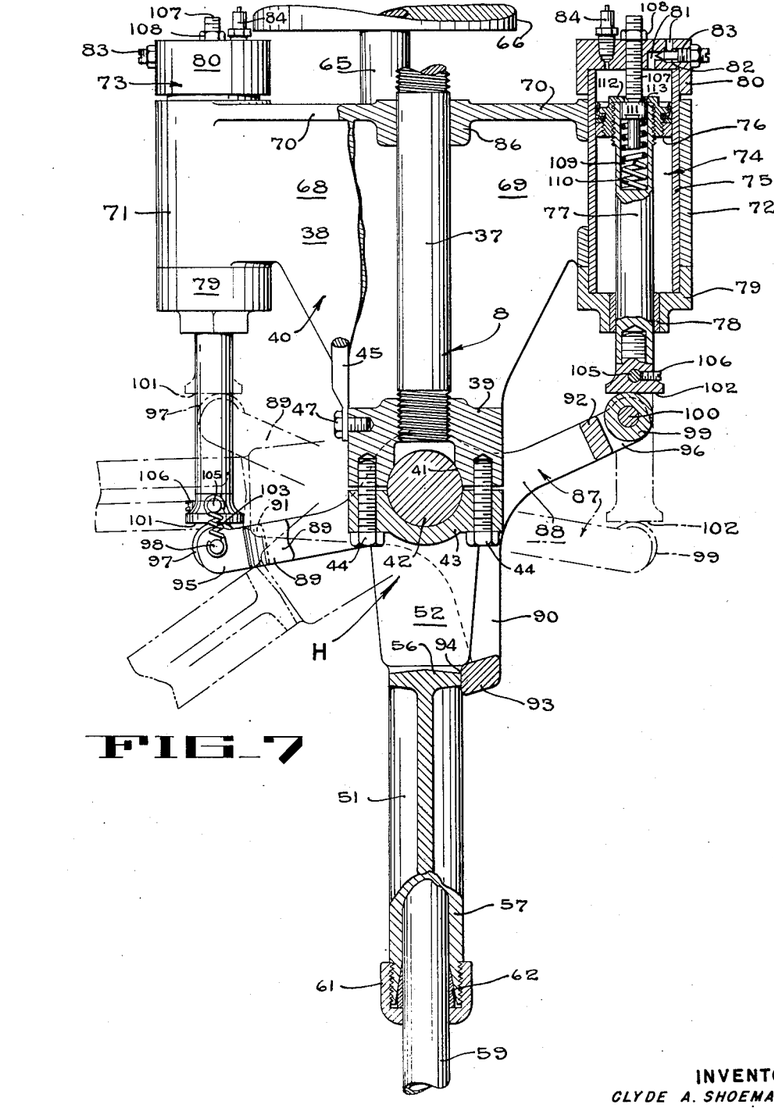
Fig. 7 is an enlarged detail of Fig. 6 taken along line 7—7 thereof and partially broken away for purposes of illustration.

Adjacent their lower ends each of the rods 31 and 32 is provided with a turnbuckle 36 having its lower end threadedly connected to a short shaft 37 which extends downwardly through a hollow casting 38 for threaded connection to a mounting block 39, Fig. 7. Each hollow casting 38 constitutes a hanger bracket 40 in that the lower face of the block 39 is provided with a recess 41 for receiving a beam preferably in the form of a bar 42. The bar 42 is secured in place against the mounting blocks 39 by suitable stirrups or straps 43, each of which is secured by bolts 44 to the under surface of the respective block for supporting the bar 42 in a horizontal position.

Figures 2, 4, 5:
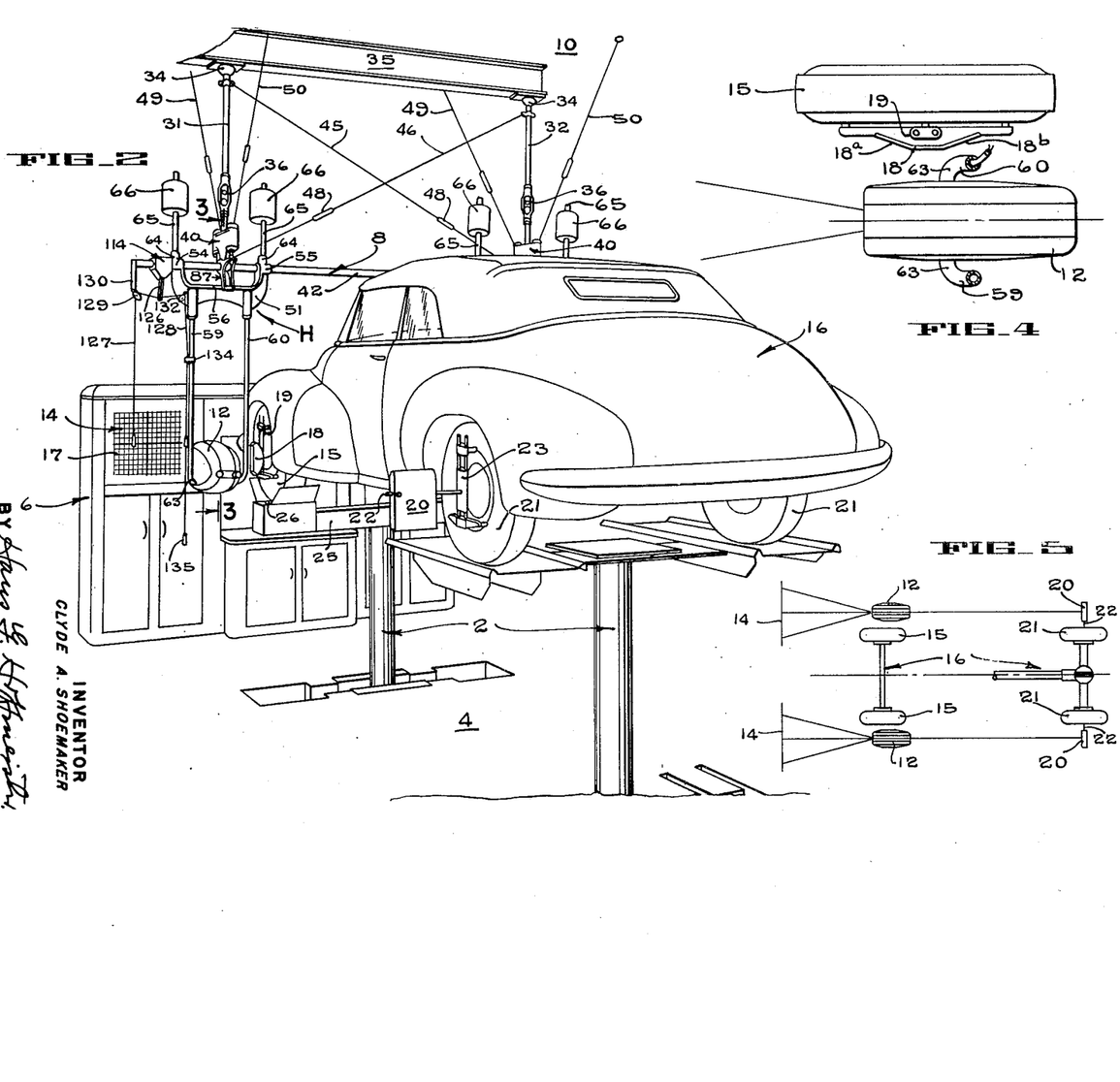
Fig. 2 is a perspective view similar to that of Fig. 1 showing the present invention in use.
Fig. 4 is a section taken along line 4—4 in Fig. 3.
Fig. 5 is a diagrammatical plan view illustrating the relative positions of the vehicle wheels and alignment checking instruments during a test.

The hanger rods 31 and 32 are maintained in parallel relation by cross tie rods 45 and 46, Figs. 1 and 2, each of which has its upper end secured to the upper end of a respective hanger rod and its lower end bolted as at 47 to the forward face of the bracket 40 on the opposite hanger rod. Each cross tie rod 45 and 46 is provided with a turnbuckle 48 for purposes of adjustment so that the beam or horizontal bar 42 can be accurately disposed perpendicular to the hanger rods and cooperate therewith to form a truss or rigid framework.

Fore and aft stay rods 49 and 50, having their lower ends suitably secured to the bracket 40 and their upper ends anchored in the ceiling construction, further rigidify the framework to maintain the horizontal bar 42 substantially stationary. In this manner, the overhead supporting apparatus 8 is disposed at a suitable height above the floor so as to allow persons and vehicles to move about on the floor area below.

Figure 6:
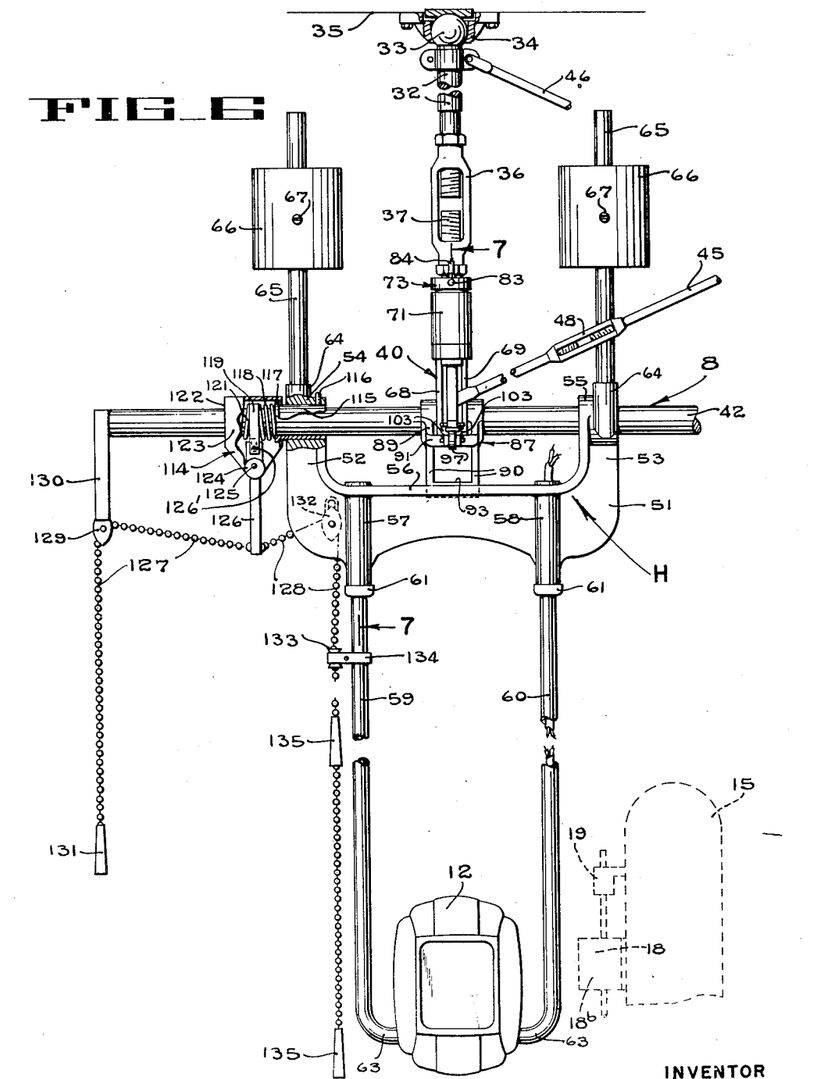
Fig. 6 is a front elevation illustrating a portion of the present invention.

A yoke casting 51, Figs. 2 and 6, is supported on each side of the framework heretofore described, each casting 51 having parallel arm portions 52 and 53 provided with suitable bearings 54 and 55, respectively, slidably arranged on the horizontal bar 42 and rotatable with respect thereto. The arms 52—53 of each yoke casting 51 straddle the respective bracket 40 so that the yokes 51 are free to slide independently of each other within limits on the horizontal bar 42. The bight portion 56 of each yoke casting 51 is provided with a pair of spaced sleeve-like formations 57 and 58 and telescopically disposed in each sleeve is the upper end of a tubular arm 59 and 60, respectively. These arms are each suitably secured in position in the associated sleeve 57—58 by a locking nut 61 acting against a wedge-like collar 62 which bears against the outer wall of the respective arm.

The lower end of each tubular arm 59 and 60 is provided with forwardly and inwardly curved portions 63 so that the ends of the arms extend into the body proper of the projection head 12 therebetween to which they are secured by suitable fastening means, not shown. Each projection head is thereby fixed to the lower end of the respective pair of arms 59—60 so that the light beams will be projected from the heads in a plane perpendicular with respect to the related arms 59—60. Each projection head 12 is so supported on the lower ends of its associated arms 59—60 as to project its several light rays in a horizontal plane when the arms 59—60 are vertically disposed. The projection heads may be adjusted vertically relative to the vehicle wheels by loosening the locking nuts 61 to facilitate adjustment of the upper ends of the arms 59—60 in their respective sleeves 57—58.

Extending perpendicularly from the bearing 54 and 55 of each yoke arm is a boss formation 64 which is offset forwardly with respect to the bearing with which it is formed, for reasons later to be made apparent. Threadedly secured in each of these bosses 64 is a bar 65 on which a counterweight 66 is slidably mounted so that the weight 66 may be adjusted lengthwise of the bar 65 and secured by set screw 67 in a position to counterbalance the weight of the tubular arms 59—60 and projection head 12 supported thereby. Each unit consisting of a yoke casting 51 with the arms 59—60 and the weighted bars 65 disposed diametrically thereof provides a counterbalanced lever or hanger H for the projection head 12 on either side of the vehicle.

Each hanger bracket 40, Fig. 7, comprises spaced vertical webs 68 and 69 formed integrally with the mounting block 39 and joined at their upper ends by an integral horizontal flange 70. The webs 68—69 are formed as parallel inverted triangles having their opposite base angle portions extending forwardly and rearwardly, respectively, of the horizontal bar 42. The webs 68—69 are joined at their base angles by circular boss formations 71 and 72 each supporting a cushioning member 73 and 74, respectively.

Each cushioning member 73—74, Fig. 7, comprises a cylinder 75 having a piston 76 arranged for sliding movement therein. A piston rod 77 having its upper end threadedly connected to the piston 76 extends through a guide 78 formed in a lower end cap 79 threadedly secured to the lower end of the cylinder 75. Sufficient clearance is provided between the rod 77 and its guide 78 to permit breathing or exhaust of air into or from the lower portion of the cylinder when the piston is reciprocated. The upper end of the cylinder is closed by a threaded cap 80 provided with a relief passage 81, the aperture 82 of which is provided with a conical seat. A needle valve 83 adjustably mounted in the cap 80 coacts with the conical seat in the passage 81 when set relative to aperture 82 for limiting the amount of air admitted to or passing from the upper portion of the cylinder 75 when the piston 76 is moved axially therein. The upper cap 80 is also provided with a valve stem 84 having a check valve plunger, not shown, therein for admitting air into the cylinder 75 when the pressure therein becomes substantially less than normal or below atmospheric pressure so as to allow the piston to be lowered in a manner as will hereinafter be described.

It will be noted that the short shaft 37, at the lower end of either hanger rod 31 or 32 extends upwardly through a boss formation 86 in the horizontal flange 70 of the respective hanger bracket 40. By this construction, the bracket 40 is rigidly connected to the apparatus 8 for supporting the two cushioning members with their reciprocable piston rods vertically disposed and equally spaced laterally of the hanger rod 42.

A rocker arm 87 is provided for each hanger unit H, each rocker arm consisting of diametrical side arms 88 and 89 disposed on the respective sides of the block 39 and pivotally mounted on the bar 42 for rocking motion with respect thereto. The arms 88—89 have like depending perpendicular arms 90 formed integrally therewith adjacent their medial portions. The arms 88—89 are integrally connected at their forward ends by a cross bar 91, at their rearward ends by a cross bar 92 and at the extremities of the arms 90 by a cross bar 93. The cross bar 93 has its leading face 94 disposed to be engaged by the bight portion 56 of the associated yoke casting 51 when the latter is rotated counterclockwise, Fig. 7.

The free ends of the diametrical arms 88—89 are provided with spaced ears 95 on their forward ends and spaced ears 96 on their rearward ends. A roller 97 is disposed between ears 95 for rotatable movement on a pin 98 extending through ears 95 and a roller 99 is disposed between ears 96 for rotatable movement on a pin 100 extending through ears 96.

The roller 97 at the forward end of the arms 88—89 is disposed to engage the lower surface 101 of the piston rod of cushioning member 73 and roller 99 is disposed to engage the lower surface 102 of the piston rod of cushioning member 74. Each roller 97 and 99 is maintained in engagement with the lower surface 101 and 102, respectively, of the associated piston rod by tension springs 103. There is a spring 103 on each side of the roller 97 and one on each side of the roller 98, the lower convolution of such springs being hooked onto the extended ends of the pin 98 and 100, respectively. The upper convolution of each spring 103 is hooked onto the respective end of a pin 105 extending diametrically through the adjacent piston rod 77, each pin 105 being secured to the respective rod by a set screw 106.

Each hanger unit H is free to rotate upon the horizontal bar 42 a predetermined segmental distance before the bight portion 56 of the yoke casting 51 engages either the foremost cross bar 91 of diametrical arms 88—89 or the cross bar 93 on the perpendicular arms 90 thereof. Thereafter, any additional movement of the arms 59—60 is dependent upon the action of the cushioning members 73—74.

Referring now to the sectional detail of the cushioning member 74, Fig. 7, it will be noted that upward movement of the piston 76 in the cylinder 75 is limited by an adjustable stop pin 107 threadedly connected to the upper cap 80 and adjustably secured to the latter by a lock nut 108. The upper end of each piston rod 77 is bored to provide an axial pocket 109 in which a compression spring 110 is disposed with a push button 111 seated on its top convolution. The open end of the pocket 109 is closed by a cap 112 formed on the piston plunger and provided with a hole 113 to receive the lower end of the stop pin 107.

The stop pin 107 is adapted to engage the push button 111 when the piston is raised a predetermined distance within the cylinder 75. By this arrangement, when the piston reaches its desired upper position, any additional movement or momentum of the hanger unit H is cushioned by slight compression of the spring 110 at the upper end of the respective piston rod 77.

Referring now to Fig. 6, it will be noted that each of the hanger units H is provided with a "walker" 114 of the type shown and described in Holmes Patent No. 2,358,010. Each "walker" generally consists of a sleeve-like bearing 115 slidably arranged on the horizontal bar 42 and extending into the outermost bearing 54 of the respective yoke 51. The sleeve 115 is secured by a set screw 116 to the bearing 54 and is provided with a flange 117 forming a seat for a compression spring 118. The spring 118 encircles the bar 42 and has its opposite end disposed to engage a plate 119. The plate 119 is provided with a hole which is larger in diameter than the horizontal bar 42 so as to allow slight tilting and binding action of the plate 119 relative to the bar 42. A similar compression spring 121 engages the outer side of the plate 119 and has its opposite end seated against an end wall 122 of a housing 123 which surrounds the several spring elements 118 and 121, as well as the flange 117 of the sleeve 115. The lower end of the housing 123 provides spaced bearings 124 supporting the ends of a pin 125 constituting a fulcrum for a lever arm 126. The lever arm 126 has its bifurcated upper end disposed to straddle a pin 126' at the lower end of the plate 119 whereby the latter is operatively connected to the lever arm 126 for effecting tilting of the plate 119.

The lever arm 126 has a chain 127 and 128 attached to its lower end on either side thereof for effecting rocking motion of the lever arm relative to its fulcrum 125. The chain 127 extends in a direction away from the yoke casting 51 and through a pulley 129 which is suitably suspended on a depending bracket 130 secured to the outer end of the horizontal bar 42. The lower end of the chain 127 is provided with a suitable handle 131 whereby to manipulate the lever arm 126 for rocking the latter relative to the plate 119. The other chain 128 extends through a pulley 132 suitably suspended from the outermost flange of the yoke casting 51 and thence downwardly through a sleeve guide 133 provided in a supporting bracket 134 clamped to the outermost arm 59. The lower end of the chain 128 is provided with suitable handles 135 whereby the chain 128 may be pulled to manipulate the lever arm 126 for rocking the latter relative to the plate 119.

The springs 118 and 121 maintain the plate 119 centered within the housing 123. Upon manipulation of the chain 128, the lever arm 126 is swung counterclockwise (Fig. 6) whereupon the bifurcated upper end of the lever 126 rocks the plate 119 into binding relation with the bar 42 against the action of springs 118—121. When the plate 119 becomes bound, the pin 126' at the lower end of the plate becomes a fulcrum for the lever 126. Consequently, upon further swinging movement of the lever 126 counterclockwise, the entire housing 123 and hanger unit H are shifted to the right (Fig. 6) by manipulation of the chain 128. Continued alternate pulling and releasing of the chain 128 will, therefore, cause the hanger unit H to be shifted in steps until it is disposed in the desired position on the bar 42. Alternate pulling and releasing of the chain 127 will effect a similar operation of the "walker" 114 to shift the related hanger unit in a direction opposite to that explained above.

Assuming the apparatus is in the position illustrated in Fig. 1 but that a vehicle driven onto the twin post lift 2 has been elevated and the mirrors 18 and 20 applied to the front and rear wheels 15 and 21, respectively, as shown in Fig. 2 of the drawings. The attending mechanic, by grasping the handles 135, can exert a downward pull on the chains 128 suspended from the respective sleeve guides 133. Each sleeve guide is disposed a sufficient distance from the bar 42 so as to effect a lever action by which a downward pull on chain 128 will cause the hanger unit H associated therewith to swing down until the projection head 12 or arms 59—60 may be grasped by the mechanic. In connection with the foregoing, it should be noted that the unit H is free to move a predetermined segmental distance without effecting operation of the rocker arm 87 and the cushioning members 73—74 associated therewith.

However, after the hanger unit H has swung through an arc of approximately 55°, the bight portion 56 of its yoke 51 engages the cross bar 93 of the rocker arm 87. Thereafter the movement of the hanger unit toward lowered or vertical position is controlled by the associated compression member 74. The speed of movement of the units H through the remaining distance toward vertical position is, therefore, retarded by the action of the pistons 76 as controlled by the passage of air through the apertures 82 at the needle valves 83 of the rearmost cushioning members 74. Moreover, when the unit H assumes a substantially vertical position, the final effect of its momentum in the direction of lowered position is absorbed by reason of engagement of the stop pin 107 with the push button 111 upon the compression spring 110 of the cushioning member.

It will be apparent that by reason of the forward offsetting of the counterbalance arms 65 relative to the arms 59—60 of each unit H, the counterweights 66 exert a positive load in a counterclockwise direction, Figs. 3 and 7, to maintain the hanger units H in vertical position. Moreover, irrespective of any jarring of the arms 59—60 or the projection head which might cause slight movement of the unit in a clockwise direction will be overcome by reason of the offsetting of the counterweights relative to the horizontal bar 42. Consequently, the units H will remain in vertical position to assure stability of the projection heads 12 in testing relation with the respective mirrors 18 and 20 on the wheels of the vehicle.

If the lateral disposition of either or both projection heads relative to the vehicle is not satisfactory, manipulation of either chain 127 or 128 to operate the related walker 114 may be resorted to so as to accommodate the testing mechanism for vehicles of various wheel gauge. The projection heads 12 can be adjusted vertically by retracting or extending the tubular arms 59—60 within their respective sleeves 57—58 for the purpose of locating the light beams on desired horizontal planes for wheels of various diameter.

It will be apparent from Fig. 2 that the wheel mounts of the vehicle are accessible throughout the entire test and that the mechanic is constantly apprised of the alignment characteristics of the wheels by the images on the screen 14.

Should it be desirable to remove the projection heads from alongside the dirigible wheels of the vehicle so that certain adjustments may be made on such wheels, the hanger units can readily be removed or temporarily raised for this purpose. After the wheels have been adjusted, the hanger units can be brought down into exactly the same position in which they were originally set so that the checking of the alignment characteristics of the wheels can be continued.

After the testing equipment has served its purpose, the unit H need only be swung upwardly by hand, clockwise Fig. 3, with sufficient force to cause the bight 56 of yoke 51 to strike the cross bar 91 of the rocker arm 87. Thereafter, the counterweights 66 overbalance the weight of the arms 59—60 and the projection head 12 therebetween to cause each unit H to continue toward horizontal or raised position. The cushioning members 73 forwardly of the horizontal bar 42 now retard the speed of movement of the units H until the push button 111 in piston 76 engage the stop pin 107 of the respective cushioning member 73.

The mirrors 18 and 20 are then removed from the respective wheels and the twin lifts 2 lowered so that the vehicle may be backed off the platform provided by the lifts.

The apparatus thereafter appears as illustrated in Fig. 1 wherein it is obvious that persons as well as vehicles may move about below the overhead suspension apparatus 8 and the floor space utilized for purposes other than wheel aligning. The projection heads, moreover, are disposed in full view, are readily accessible and are conveniently stored in an otherwise unused portion of the shop where they are least likely to become damaged or tampered with.

While the invention herein has been described in detail, it will be apparent that the structural details thereof may be varied, altered, or modified without departing from the spirit of the invention. I, therefore, desire to avail myself of all variations, alterations, and modifications coming within the scope of the appended claims.

What I claim as new and desire to protect by Letters Patent is:

1. An overhead suspension for apparatus for checking the alignment characteristics of the wheels on a vehicle mounted on a lift for elevating a vehicle above floor level, comprising an overhead beam supported horizontally a sufficient distance above floor level to allow traffic to flow under said beam, a counterbalanced arm pivotally mounted on said beam and having an instrument at one of its extremities adapted to detect errors in alignment of vehicle wheels, said arm including counterweights offset laterally relative to the axis of said arm tending to maintain the same in vertical disposition when said arm is substantially so disposed and for urging said arm toward a storage position in the horizontal plane of said beam when said arm is manually urged out of substantial vertical position, and means on said beam and operable by said arm as the latter approaches either horizontal or vertical position for retarding and limiting movement of said arm.

2. An overhead suspension for apparatus for checking the alignment characteristics of the wheels on a vehicle, comprising a beam, means for supporting said beam in a horizontal position a sufficient height above floor level so as to allow persons and vehicles to move about below said beam, lever arms pivotally mounted on said beam for swinging movement between horizontal storage position and vertical operative position in which the arms are disposed at either side of a vehicle, an error detecting instrument of said alignment checking apparatus secured to one end of each of the lever arms for testing relation with the wheels of the vehicle therebetween, cushioning members on said beam, and a lost motion member mounted on said beam and adapted to engage said arms and said cushioning members for absorbing shock due to the momentum of said lever arms as they approach either their storage or their operative positions.

3. An overhead suspension device for an optical wheel aligner comprising a vertically disposed framework provided with horizontally spaced hanger rods and a horizontal beam, means for securing said framework to a portion of a building to support said beam a predetermined distance above floor level, a counterbalanced lever pivotally mounted on said frame for swinging movement between a horizontal storage position and a vertical operating position, an alignment checking instrument carried at one free end of said lever and adapted when the latter is in operating position to be disposed in the same plane as the wheels on a vehicle, means for shifting said lever axially along said beam for positioning said checking instrument in testing relation with respect to said wheels, said shifting means comprising a housing connected to said lever, a plate arranged within said housing and on said beam for tilting action relative thereto, spring means on either side of said plate for maintaining the latter in normal position within said housing, an arm pivotally connected to said housing and adapted operatively to engage said plate therein, and flexible elements connected to said arm and accessible for hand operation by a person standing on the floor level below for moving said arm to effect tilting of said plate into binding relation with said beam whereby said plate provides a fulcrum for said arm to effect movement of said arm, housing, and lever in one or the other direction axially of said beam.

4. An overhead suspension device for an error detecting instrument of an apparatus for checking the alignment characteristics of vehicle wheels, comprising a trusswork including a bar rigidly suspended in horizontal position a predetermined distance above floor level, a lever unit mounted on said bar and carrying said detecting instrument for swinging movement into either storage position in a plane horizontally of said bar or operative position vertically of said bar, and a lateral positioning device mounted on said bar and operatively connected to said lever unit for shifting the latter lengthwise along said bar for positioning said detecting instrument in testing relation relative to the wheels of a vehicle to be tested, a guide sleeve secured to said lever arm a substantial distance from said bar, and a manually operable flexible member connected to said shifting device and guided for axial movement through said guide sleeve in axially vertical position and binding on said guide sleeve when in axially horizontal position to facilitate initial movement of said lever arm from storage position toward operative position.

5. An overhead suspension device for an error detecting instrument of an apparatus for testing the alignment characteristics of vehicle wheels comprising a truss suspended from a portion of a building, a horizontal bar supported on said truss a predetermined distance above floor level, a lever unit carrying said detecting instrument at one end thereof and mounted on said bar for swinging movement, means on said truss for limiting swinging movement of said lever unit between a horizontal and a vertical position relative to said bar, said lever unit having counterweights thereon, said counterweights being offset angularly relative to said lever unit in a direction of swinging movement thereof tending to maintain the same in vertical position when the lever unit is substantially vertically disposed and to urge said lever unit toward horizontal position after movement thereof by an outside force out of substantially vertical position.

6. An overhead suspension device comprising a hanger bracket, a bar secured to said bracket in horizontal position, a lever arm pivotally mounted on said bar, cushioning members on said bracket on either side of said bar and in the plane of pivotal movement of said lever arm, a lost motion member rotatably supported on said bar operatively connected to said cushioning members and engageable by said lever arm as it approaches a position horizontally of said bar or vertically thereof for absorbing the impact of the movement of said lever arm, and a counterweight connected to said lever arm and offset therefrom in a direction of swinging movement thereof for urging the latter into either its vertical or horizontal position relative to said bar after initial movement of said arm beyond a predetermined intermediate position.

7. Suspension apparatus for optical wheel aligning apparatus of the type employing a projection head for projecting light beams at mirrors mounted on the front and rear wheels of a vehicle for reflection onto a screen to determine the alignment characteristics of said wheels; comprising a counterbalanced arm adapted to have said projection head secured to one of its ends, means supported at clearance height above the vehicle under test for mounting said counterbalanced arm for pivotal movement, arresting means mounted on said arm mounting means to arrest pivotal movement of the arm at predetermined limits of angular movement thereof for storing the projection head above the vehicle or for positioning the projection head in testing relation with the mirrors on the front and rear wheels of the vehicle, and means inter-engaging the arm and the arresting means adjacent a limit of angular movement of said arm for cushioning the impact of the arresting means in arresting movement of said arm upon arrival thereof at either storing or testing position.

8. Suspension apparatus for optical wheel aligning apparatus of the type employing a projection head for projecting light beams at mirrors mounted on the front and rear wheels of a vehicle for reflection onto a screen to determine the alignment characteristics of said wheels; comprising a counterbalanced arm having said projection head secured to one of its ends, means supported at clearance height above the vehicle under test for mounting said counterbalanced arm for pivotal movement for storing the projection head above the vehicle or for positioning the projection head in testing relation with the mirrors on the front and rear wheels of the vehicle, means for cushioning the impact of the movement of said arm upon arrival thereof at either storing or testing position, and a lost motion member pivotally mounted with said arm and interposed between the same and said cushioning means whereby said arm is freely movable for the major portion of its pivotal movement between storing or testing position.

9. An overhead suspension device for an error detecting instrument of an apparatus for testing the alignment characteristics of vehicle wheels comprising a bar, means for supporting said bar horizontally a sufficient distance above floor level to allow movement of persons and vehicles below said bar, a lever unit carrying said detecting instrument at one end thereof and mounted for swinging movement on said bar, said lever unit being counterweighted to cause the same to swing in either direction after movement thereof by an outside force past a predetermined intermediate position, cushioned arresting means mounted on said beam, and a lost motion member operatively interposed between said arm and said arresting means for cushioning the impact of arresting the movement of said lever unit and for limiting movement thereof beyond the horizontal plane of said bar for storing said detecting instrument above floor level or for limiting movement of said lever unit beyond a plane vertically of said bar for positioning said detecting instrument in testing relation adjacent the wheels of a vehicle.

10. An overhead suspension for apparatus for checking the alignment characteristics of the wheels on a vehicle mounted on a lift for elevating a vehicle a predetermined distance above floor level, said suspension comprising an overhead truss including a horizontal bar disposed a sufficient distance above floor level to allow traffic in the area of the floor below said bar, a lever arm pivotally mounted on said bar for swinging movement in a plane parallel to the long axis of the elevated vehicle, an instrument for checking the alignment characteristics of said wheels secured to the extremity of said arm adapted to be disposed in testing relation to the wheels of the elevated vehicle, means on said truss for limiting movement of said lever arm between vertical and horizonal position relative to said bar, and weighted means secured to said lever arm in offset relation to a plane through said lever arm perpendicular to its plane of swing for counterbalancing the weight of said lever arm and instrument relative to said bar and tending to urge the same into either vertical or horizontal position depending upon movement thereof beyond a predetermined intermediate position by an outside force.

11. An overhead suspension apparatus comprising a hanger bracket, a bar secured to said bracket in horizontal disposition, a yoke pivotally mounted on said bar, a pair of arms secured to said yoke in parallel relation, means for securing an error detecting instrument to the ends of said arms for hanging disposition adjacent the wheels of a vehicle to be checked, a pair of counterarms secured to said yoke for extension diametrically opposite said arms and offset laterally of the axis of said bar, counterweights on said counterarms for overbalancing the weight of said arms and detecting instrument to urge the same toward said hanging disposition and adapted, upon manual positioning thereof a predetermined distance away from said hanging disposition, to urge said arms and detecting instrument toward horizontal disposition relative to said bar, and means for limiting movement of said arms beyond either hanging or horizontal disposition.

12. An overhead suspension apparatus comprising a hanger bracket, a bar secured to said bracket in horizontal disposition, a yoke pivotally mounted on said bar, a pair of arms secured to said yoke in parallel relation, means for securing an instrument for detecting errors in wheel alignment to said arms for hanging disposition adjacent the wheels of a vehicle to be checked, a pair of counterarms secured to said yoke for extension diametrically opposite said arms and offset laterally of the axis of said bar, counterweights on said counterarms for overbalancing the weight of said arms and detecting instrument to urge the same toward said hanging disposition and adapted, upon manual positioning thereof a predetermined distance away from said hanging disposition, to urge said arms and detecting instrument toward horizontal disposition relative to said bar, means for limiting movement of said arms beyond either hanging or horizontal disposition comprising a cushioning member at either side of said bar in the plane of movement of said arms, and a lost motion member rotatably mounted on said bar operatively connected to said cushioning members and engageable by said yoke when said arms approach either hanging or horizontal position.

13. An overhead suspension apparatus for checking the alignment characteristics of the wheels on vehicles, comprising a beam, means for supporting said beam in a horizontal position a sufficient height above floor level to allow persons and vehicles to move about under the beam, lever arms pivotally mounted on said beam for swinging movement between horizontal storage position and vertical operative position in which the arms are disposed at the sides of a vehicle, means for securing an error detecting instrument for said alignment characteristic checking apparatus to each of the lever arms for disposition in testing relation with the wheels of the vehicle therebetween, means on said beam for absorbing shock due to the momentum of said lever arms during movement thereof toward storage or operative position, and a lost motion member rockable on said beam connected to said shock absorbing means and adapted to be engaged by said lever arms upon substantial arrival thereof in either storage or operative position whereby said arms can be initially moved from one of said positions toward the other of said positions free of the influence of said shock absorbing means.

14. An overhead suspension for apparatus for checking the alignment characteristics of the wheels on a vehicle, comprising a beam, means for supporting said beam in a horizontal position a sufficient height above floor level to allow persons and vehicles to move about below said beam, lever arms pivotally and axially movably mounted on said beam for swinging movement between horizontal storage position and vertical operative position in which the arms are disposed at the sides of a vehicle, means for securing an error detecting instrument for said alignment checking apparatus to each of the lever arms for disposition in testing relation with the wheels of the vehicle therebetween, means on said beam for absorbing shock due to the momentum of said lever arms during movement thereof toward storage or operative position, a rocker arm on said beam connected to said shock absorbing means and adapted to be engaged by said lever arms upon substantial arrival thereof in either of its storage or operative positions whereby said arms can be initially moved toward one or the other of said positions free of the influence of said shock absorbing means, and manually operable means mounted on said beam and connected to each of said lever arms for individually shifting said arms axially along said beam toward or away from said vehicle for positioning said detecting instruments in testing relation adjacent the wheels thereon.

15. An overhead suspension for apparatus for checking the alignment characteristics of the wheels on a vehicle mounted on a lift for elevating a vehicle a predetermined distance above floor level, comprising an overhead truss including a horizontal bar disposed a sufficient distance above floor level to allow traffic in the area of the floor below said bar, a lever arm pivotally mounted on said bar for swinging movement in a plane parallel to the long axis of the elevated vehicle, means for mounting a vehicle wheel alignment checking and error detecting instrument on the extremity of said arm and adapted to be disposed in testing relation to the wheels of said vehicle, means on said truss for limiting movement of said lever arm between vertical and horizontal position relative to said bar, weighted means mounted in offset relation to a plane defined by the longitudinal axis of the lever arm and its axis of swing for counterbalancing the weight of said lever arm and instrument relative to said bar and tending to urge the lever arm into either vertical or horizontal position depending upon movement thereof beyond a predetermined intermediate position by an outside force, said limiting means comprising a cushioning member disposed on opposite sides of said bar in the plane of movement of said arm, and a member rotatably mounted on said bar and adapted to be engaged by said cushioning members and said lever arm prior to arrival of the latter in either horizontal or vertical position for absorbing the momentum due to movement of said lever arm, instrument, and counterbalancing means.

16. An overhead suspension device for the projection head of apparatus for checking the alignment characteristics of vehicle wheels, comprising a horizontal bar, means for supporting said horizontal bar a predetermined distance above floor level, a pair of cushioning means mounted on said supporting means in a plane transversely of said bar and disposed to either side of the same, a pair of rigid arms having said projection head secured between their extremities, means for uniting said arms for joint pivotal movement about said bar, counterarms extending oppositely to said arms and offset relative thereto, counterweights on said offset counterarms for effecting maintenance of said arms and projection head in pendant position and for maintaining said arms and projection head substantially horizontally of said bar after movement of said arms a predetermined distance away from pendant position, lost motion means pivotally mounted on said bar adapted to be engaged by said arm uniting means after a major portion of the movement of said arms toward either pendant or horizontal position, and means for interconnecting said lost motion means with said cushioning means for retarding movement of said arms and their uniting means during the remainder of their movement toward either pendant or horizontal positions.

CLYDE A. SHOEMAKER.

REFERENCES CITED

The following references are of record in the file of this patent:

UNITED STATES PATENTS

| Number | Name | Date |
|---|---|---|
| 444,273 | Cliff | Jan. 6, 1891 |
| 685,455 | Kinkead | Oct. 29, 1901 |
| 750,829 | Detrick | Feb. 2, 1904 |
| 1,047,214 | Hanze | Dec. 17, 1912 |
| 1,564,886 | O'Neill | Dec. 8, 1925 |
| 1,596,371 | Nirdlinger | Aug. 17, 1926 |
| 1,677,028 | Frech | July 10, 1928 |
| 2,358,010 | Holmes | Sept. 12, 1944 |
| 2,410,339 | Creagmile | Oct. 29, 1946 |
| 2,470,090 | Carrigan et al. | May 17, 1949 |